US008243823B2

(12) United States Patent
Singh et al.

(10) Patent No.: US 8,243,823 B2
(45) Date of Patent: Aug. 14, 2012

(54) METHOD AND SYSTEM FOR WIRELESS COMMUNICATION OF UNCOMPRESSED VIDEO INFORMATION

(75) Inventors: Harkirat Singh, Santa Clara, CA (US); Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1266 days.

(21) Appl. No.: 11/897,087

(22) Filed: Aug. 29, 2007

(65) Prior Publication Data

US 2009/0063935 A1 Mar. 5, 2009

(51) Int. Cl.
*H04N 7/12* (2006.01)
*H04N 11/02* (2006.01)
*H04N 11/04* (2006.01)

(52) U.S. Cl. .......... 375/240.26; 375/240.1; 375/240.21; 375/240.27

(58) Field of Classification Search ............... 375/240.1, 375/21, 24, 26, 27
See application file for complete search history.

(56) References Cited

U.S. PATENT DOCUMENTS

| | | | |
|---|---|---|---|
| 4,661,862 A | 4/1987 | Thompson | |
| 5,189,510 A * | 2/1993 | Henaff et al. | 358/500 |
| 5,289,190 A | 2/1994 | Shimoda et al. | |
| 5,453,840 A * | 9/1995 | Parker et al. | 356/400 |
| 5,936,669 A | 8/1999 | Niesen | |
| 5,969,764 A | 10/1999 | Sun et al. | |
| 6,052,159 A | 4/2000 | Ishii et al. | |
| 6,094,453 A | 7/2000 | Gosselin et al. | |
| 6,115,420 A | 9/2000 | Wang | |
| 6,201,834 B1 | 3/2001 | Zhu | |
| 6,239,886 B1 * | 5/2001 | Klassen et al. | 358/518 |
| 6,418,240 B1 * | 7/2002 | Yu | 382/232 |
| 6,512,218 B1 * | 1/2003 | Canini et al. | 250/208.1 |
| 6,571,016 B1 * | 5/2003 | Mehrotra et al. | 382/236 |
| 6,757,435 B2 * | 6/2004 | Kondo | 382/238 |
| 6,868,186 B1 * | 3/2005 | Sadeh | 382/238 |

(Continued)

FOREIGN PATENT DOCUMENTS

KR 1020090100219 A 9/2009

(Continued)

OTHER PUBLICATIONS

Hitachi, Ltd. et al., "High-Definition Multimedia Interface (HDMI)," Aug. 2005, pp. 1-214, Specification Version 1.2, HDMI Licensing LLC.

(Continued)

*Primary Examiner* — Christian LaForgia
*Assistant Examiner* — James Turchen
(74) *Attorney, Agent, or Firm* — Kenneth L. Sherman, Esq.; Michael Zarrabian, Esq.; Sherman & Zarrabian LLP

(57) ABSTRACT

A method and system for communication uncompressed video over a wireless communication medium is provided. Pixels in an uncompressed video frame are grouped into groups of pixels for wireless transmission from a transmitter to a receiver, wherein the neighboring pixels in each group possess (have) high spatial correlation. Upon receiving the pixel groups, the receiving station reconstructs the video frame from the received pixel groups, wherein upon detecting an erroneous pixel in a group, information from one or more neighboring pixels in that pixel group are used in place of the erroneous pixel. Further, FEC encoding is utilized recovering bit-errors.

37 Claims, 13 Drawing Sheets

U.S. PATENT DOCUMENTS

| | | | |
|---|---|---|---|
| 6,973,221 | B1 | 12/2005 | Xue |
| 7,015,961 | B2 | 3/2006 | Kakarala |
| 7,027,515 | B2 | 4/2006 | Lin |
| 7,075,993 | B2 * | 7/2006 | O'Brien, Jr. ............. 375/240.27 |
| 7,082,166 | B2 | 7/2006 | Prakash et al. |
| 7,103,669 | B2 | 9/2006 | Apostolopoulos |
| 7,113,556 | B1 | 9/2006 | Heegard et al. |
| 7,227,900 | B2 | 6/2007 | Porter et al. |
| 7,283,165 | B2 * | 10/2007 | Alderson et al. .............. 348/246 |
| 7,339,993 | B1 * | 3/2008 | Brooks et al. ............ 375/240.26 |
| 7,630,442 | B2 | 12/2009 | Sekiguchi et al. |
| 7,734,106 | B1 | 6/2010 | Zhang et al. |
| 7,991,055 | B2 * | 8/2011 | Cancemi et al. ......... 375/240.27 |
| 2006/0013320 | A1 * | 1/2006 | Oguz et al. ............... 375/240.27 |
| 2006/0146940 | A1 * | 7/2006 | Gomila et al. ............ 375/240.27 |
| 2006/0239360 | A1 | 10/2006 | Kadono et al. |
| 2007/0014360 | A1 | 1/2007 | Botzko et al. |
| 2007/0091999 | A1 * | 4/2007 | Nissan-Cohen et al. ... 375/240.2 |
| 2007/0098063 | A1 * | 5/2007 | Reznic et al. ............. 375/240.2 |
| 2007/0189383 | A1 * | 8/2007 | Shao et al. ............... 375/240.12 |
| 2007/0202842 | A1 | 8/2007 | Shao et al. |
| 2008/0101467 | A1 * | 5/2008 | MacMullan et al. ..... 375/240.12 |
| 2008/0107330 | A1 | 5/2008 | Cotman et al. |
| 2008/0144553 | A1 | 6/2008 | Shao et al. |
| 2008/0232478 | A1 * | 9/2008 | Teng et al. ............... 375/240.27 |
| 2008/0267299 | A1 * | 10/2008 | Hannuksela et al. .... 375/240.27 |
| 2008/0285651 | A1 * | 11/2008 | Au et al. .................. 375/240.16 |
| 2009/0021646 | A1 | 1/2009 | Shao et al. |
| 2009/0034629 | A1 * | 2/2009 | Suh et al. ................. 375/240.27 |
| 2010/0265392 | A1 | 10/2010 | Shao et al. |

FOREIGN PATENT DOCUMENTS

| | | | |
|---|---|---|---|
| WO | 2004073201 | A1 | 8/2004 |
| WO | 2008060025 | A1 | 5/2008 |

OTHER PUBLICATIONS

International Search Report dated Oct. 12, 2007 for International Application No. PCT/KR2007/003251 from Korean Intellectual Property Office, filed Jul. 4, 2007, pp. 1-2.

Schwarz, H. et al., "Overview of the Scalable Video Coding Extension of the H.264/AVC Standard", IEEE Transactions on Circuits and Systems for Video Technology, vol. 17, No. 9, Sep. 2007, pp. 1-18, United States.

International Search Report and Written Opinion mailed Dec. 6, 2010 in PCT/KR2010/002192, 6 pages, Korean Intellectual Property Office, Republic of Korea.

International Search Report and Written Opinion dated Oct. 12, 2007 for International Application No. PCT/KR2007/003251 from Korean International Property Office, filed Jul. 4, 2007, 10 pages, Seo-gu, Daejeon, Republic of Korea.

Korean Office Action dated Nov. 11, 2009 for Korean Patent Application No. 10-2008-7006604, pp. 1-3, Korean Intellectual Property Office, Seo-gu, Daejeon, Republic of Korea (A machine-generated English translation, pp. 1-2).

Korean Final Office Action dated Feb. 18, 2010 for Korean Patent Application No. 10-2008-7006604, pp. 1-2, Korean Intellectual Property Office, Seo-gu, Daejeon, Republic of Korea (A machine-generated English translation, p. 1).

U.S. Non-Final Office Action for U.S. Appl. No. 11/598,920 mailed May 6, 2011.

U.S. Final Office Action for U.S. Appl. No. 11/598,920 mailed Oct. 19, 2011.

U.S. Non-Final Office Action for U.S. Appl. No. 11/598,920 mailed Apr. 3, 2012.

U.S. Non-Final Office Action for U.S. Appl. No. 12/048,126 mailed Dec. 28, 2011.

WirelessHD, LLC, "WirelessHD Specification," Revision 0.9.1d1, Jun. 13, 2007, pp. i-427, United States.

* cited by examiner

100

METHOD AND SYSTEM FOR WIRELESS COMMUNICATION OF UNCOMPRESSED VIDEO INFORMATION

FIELD OF THE INVENTION

The present invention relates to wireless communication and in particular, to wireless communication of video information.

BACKGROUND OF THE INVENTION

With the proliferation of high quality video, an increasing number of electronic devices (e.g., consumer electronics (CE) devices) utilize high-definition (HD) video. Conventionally, most systems compress HD content, which can be around 1 Gbps (gigabits per second) in bandwidth, to a fraction of its size to allow for transmission between devices. However, with each compression and subsequent decompression of the signal, some data can be lost and the picture quality can be degraded.

Uncompressed video pixels exhibit high spatial correlation, wherein neighboring pixels have almost similar values. This spatial correlation allows reusing a neighboring pixel in place of an erroneously received pixel. However, because sharp edges of a picture can result in a sudden change in neighboring pixel values this assumption of spatial correlation is not always true.

FIG. 1 shows an example illustrating the drawbacks of spatial-reuse, wherein a pixel B in a received frame 10 includes erroneous bits. Each pixel is made up of three components 12 such as $C_Y$, $C_B$, $C_R$ (or R, G, B). To compensate for the erroneous pixel B, the receiver reuses pixels by displaying either neighboring pixel A or C instead of pixel B. However, in this scenario, pixels A and B have the same pixel component values, while pixel C has different component values than pixel B. Thus, in this scenario, the bit errors of pixel B are effectively compensated only if the receiver by chance selects pixel C for display in place of erroneous pixel B. Unless pixel C is selected, the pixel reuse scheme is ineffective in maintaining quality for the received video signal.

BRIEF SUMMARY OF THE INVENTION

The present invention provides a method of communication uncompressed video information over a wireless communication medium. In one embodiment, pixels in an uncompressed video frame are grouped into logical groups of pixels, such that the neighboring pixels in each logical group possess (have) high spatial correlation.

Grouping pixels includes grouping sub-samples of each set of neighboring pixels into a corresponding macropixel, and logically grouping each set of macropixels with similar component values into a corresponding spatial pixel group. Further, in one example, grouping each set of macropixels includes using the most significant bit (MSB) of each component in each macropixel in determining which adjacent N macropixels have similar MSBs. Such N macropixels are then logically grouped into a spatial pixel group. As such, in this example, all macropixels in a spatial pixel group have the same pair-wise MSBs for components such as luminance and chrominance.

The logical groups of pixels are then transmitted from a transmitting wireless station to a receiving wireless station, over the wireless communication medium. Upon receiving the logical groups, the receiving station attempts reconstruction of a video frame from the received pixels. Upon detecting an erroneous pixel in a logical group, the receiver utilizes information from one or more pixels in that pixel group in place of the erroneous pixel. Each spatial pixel group includes delimiters for identifying boundaries of a received spatial pixel group. Reconstructing the video frame from the received logical groups further includes using a spatially correlated macropixel in the spatial pixel group, which is correctly received, in place of the erroneous pixel in that spatial pixel group.

For bit-error recovery, forward error correction (FEC) information is provided within each spatial pixel group, and transmitted with the spatial pixel group. In one example, FEC information for each spatial pixel group includes placing the MSBs of all macropixels in the spatial pixel group, into a selected macropixel in the spatial pixel group, and performing forward error correction (FEC) for the MSBs in the selected macropixel to obtain FEC information. The FEC information is transmitted in the spatial pixel group. Transmitting the FEC information can further include using the MSB position of macropixels in the spatial pixel groups other than the selected macropixel to store the FEC information for the MSBs stored in the selected macropixel. Reconstructing the video frame further includes the steps of receiving the transmitted FEC information, and using the FEC information to recover errors in the received spatial groups.

These and other features, aspects and advantages of the present invention will become understood with reference to the following description, appended claims and accompanying figures.

BRIEF DESCRIPTION OF THE DRAWINGS

In the drawings, like references refer to like elements.

DETAILED DESCRIPTION OF THE INVENTION

The present invention provides a method and system for wireless communication of uncompressed HD video content. In one embodiment, pixel reuse and forward error correction (FEC) are implemented in wireless communication.

One implementation of the present invention involves transmission of high-quality uncompressed video (e.g., 1080p RGB format) over a wireless channel which provides sufficient bandwidth to support the uncompressed video with limited retransmissions. An example application for transmission of uncompressed HD video signals in a 60 GHz frequency band such as in WirelessHD (WiHD) is described below. WiHD is an industry-led effort to define a wireless digital network interface specification for wireless HD digital signal transmission on the 60 GHz frequency band, (e.g., for CE devices).

Figure 1:
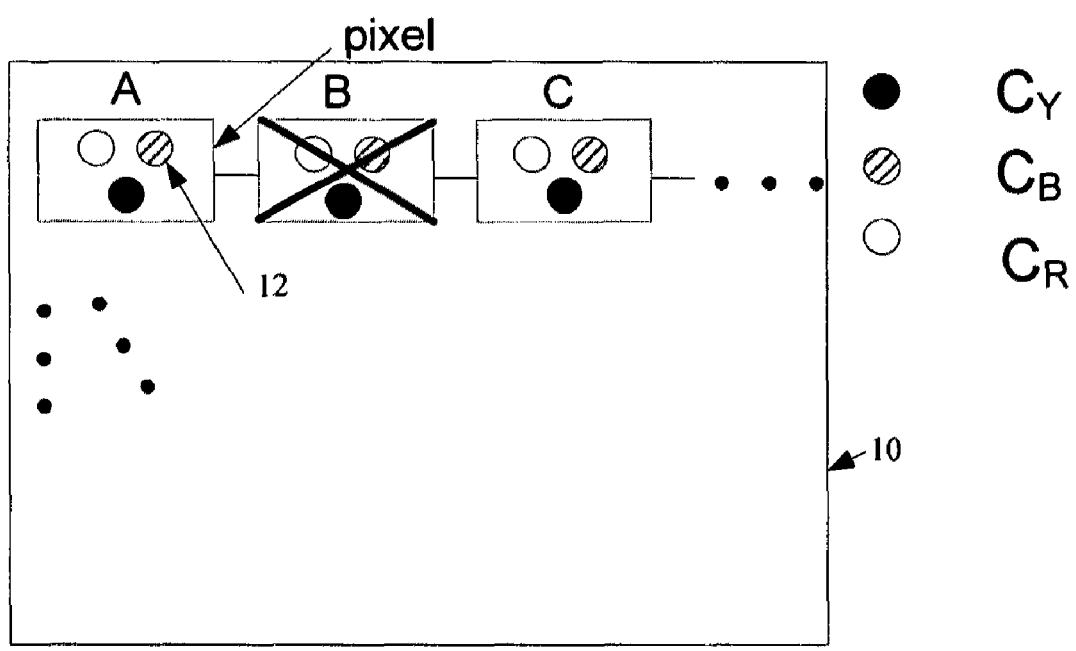
FIG. 1 shows an example illustrating the drawbacks of spatial-reuse of transmitted pixels at a receiver.
Figure 2A:
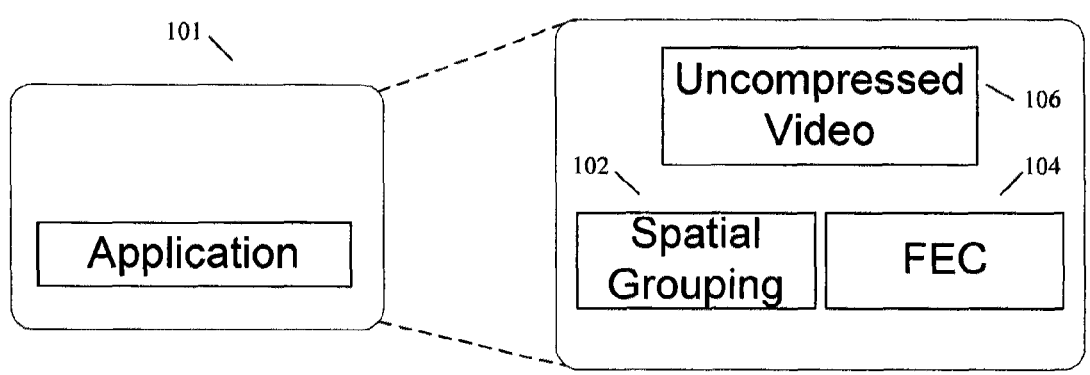
FIG. 2A shows an architecture for communication of uncompressed HD video content over wireless channels, according to an embodiment of the present invention.

FIG. 2A shows an architecture 100 for communication of uncompressed HD video content over wireless channels, according to an embodiment of the present invention. A video processing application function 101 performs a spatial grouping process 102 and an FEC process 104 on an uncompressed HD video 106, for transmission to a receiver over a 60 GHz wireless channel. The spatial grouping process 102 exploits spatial redundancy of the uncompressed video pixels to be transmitted over a wireless medium, and provides a receiver with information for selectively reusing correctly received pixels in place of erroneous pixels.

Figure 2B:
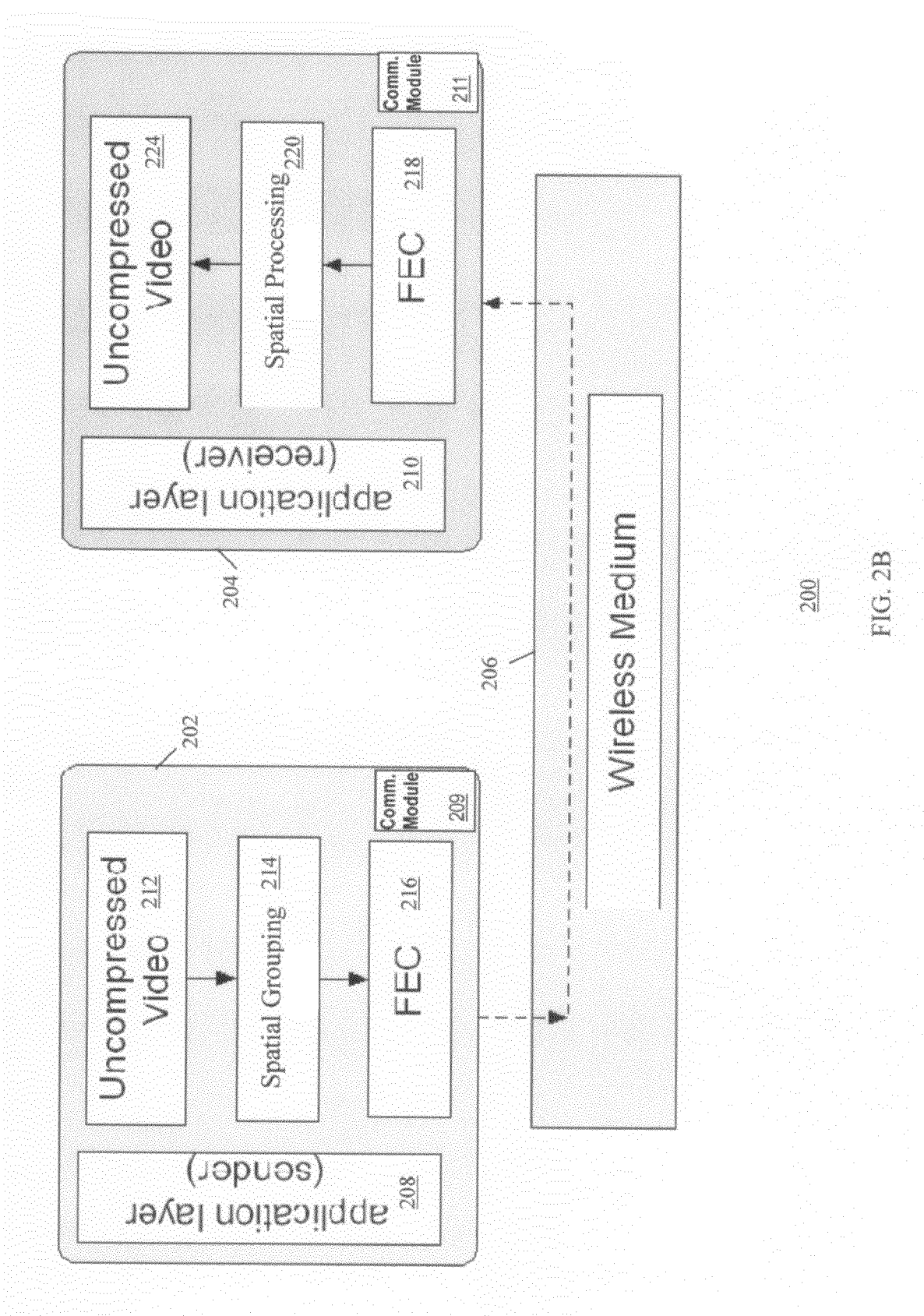
FIG. 2B shows a functional diagram of a wireless system based on the architecture in FIG. 2A, according to an embodiment of the present invention.

FIG. 2B shows a functional diagram of a wireless system 200 based on the architecture in FIG. 2A, according to an embodiment of the present invention. The system 200 includes a wireless station 202 functioning as a transmitter (sender) and a wireless station 204 functioning as a receiver 204, communicating via wireless medium 206 (e.g., radio frequency (RF) over a 60 GHz frequency band). An application layer 208 at the station 202 provides uncompressed video comprising a frame of uncompressed HD video 212 for wireless transmission to an application layer 210 at the station 204.

Each uncompressed video frame 212 at the transmitter is divided into multiple scan lines. Each scan line includes an integer number of pixels, each pixel including multiple component values (e.g., $C_Y$, $C_B$, $C_R$). Each component includes either a color component (chrominance) or a luminance component of a video pixel. Quantization for pixel depth (bits per sample (bitplane)), may be, e.g., 8-bit, 10-bit, 12-bit, or 16-bit values. Considering an 8-bit quantization and 60 frames/second, one second of uncompressed video (e.g., 1080 p RGB format) can be expressed as 60×3×8×1920×1080=2.98 Gbits. This requires a large data rate which places significant constraints on retransmissions, indicating retransmissions should be avoided to ensure continuous playback at the receiver.

A transmitter spatial grouping function 214 implements a spatial grouping process that utilizes spatial correlations between pixels of uncompressed video frame 212, to provide information to a receiver spatial processing function 220 for determining which correctly received pixels to reuse in place of erroneous pixels. This allows the receiver spatial processing function 220 to perform error recovery by selectively reusing correctly received pixels in place of erroneous pixels, in the absence of retransmissions.

In one embodiment, the transmitter spatial grouping function 214 provides the receiver spatial processing function 220 with information indicating neighboring pixels in the video frame 212 that have similar pixel components. Based on such information, the receiver spatial processing function 220 can efficiently determine which pixels to reuse for display in place of an erroneous pixel (i.e., reuse a pixel that is similar in component values $C_Y$, $C_B$, $C_R$ to an erroneous pixel).

Figure 3:
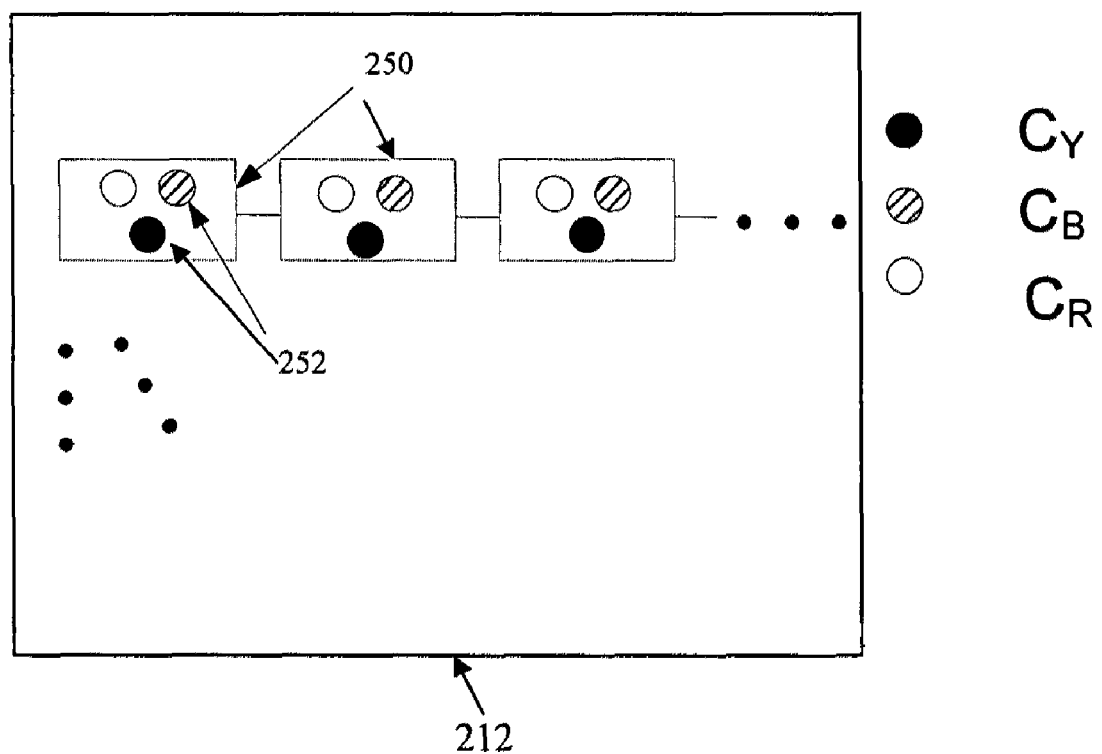
FIG. 3 shows an example of uncompressed video frame, wherein each pixel includes three component values, $C_Y$, $C_R$, $C_B$.
Figure 4:
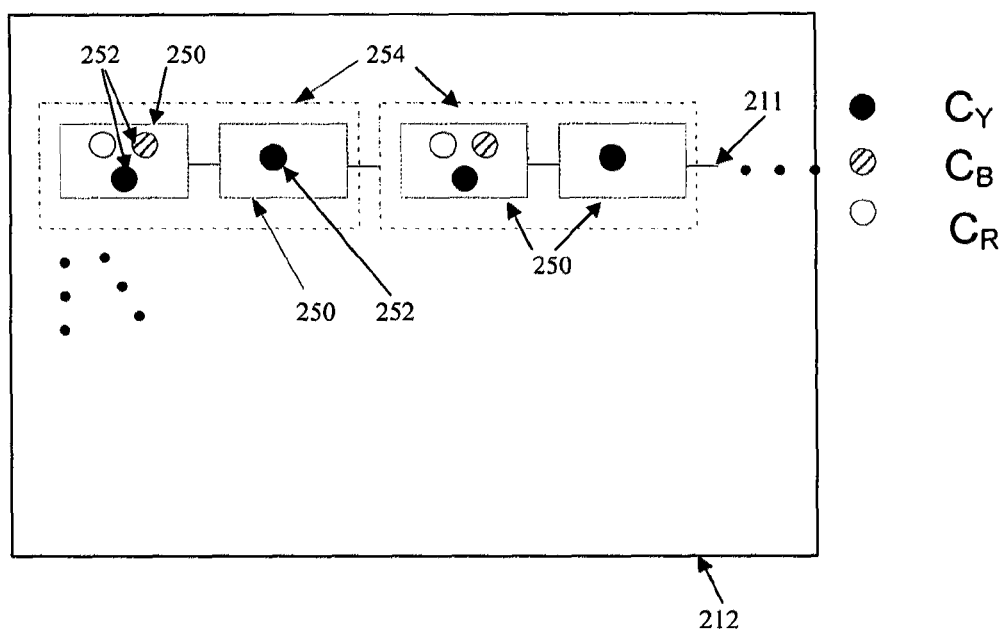
FIG. 4 shows a sub-sampling of the video frame of FIG. 3 at 4:2:2, wherein a macropixel includes four values from two neighboring pixels on one scan line.
Figure 5:
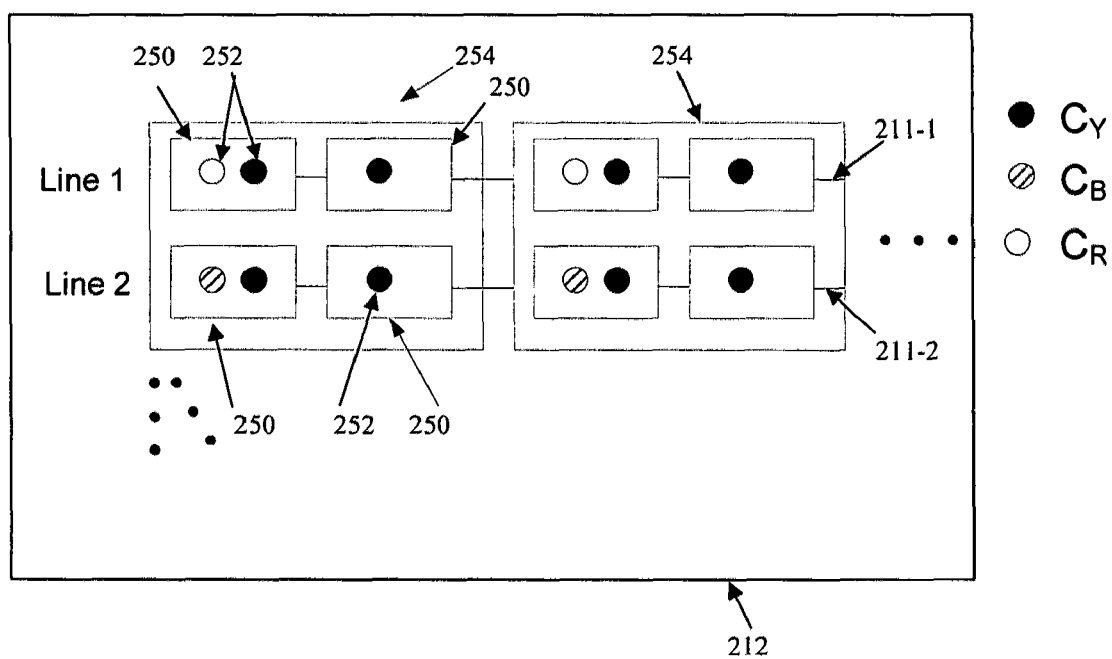
FIG. 5 shows a sub-sampling of the video frame of FIG. 3 at 4:2:0, wherein a macropixel includes six values from four neighboring pixels on two scan lines.
Figure 6:
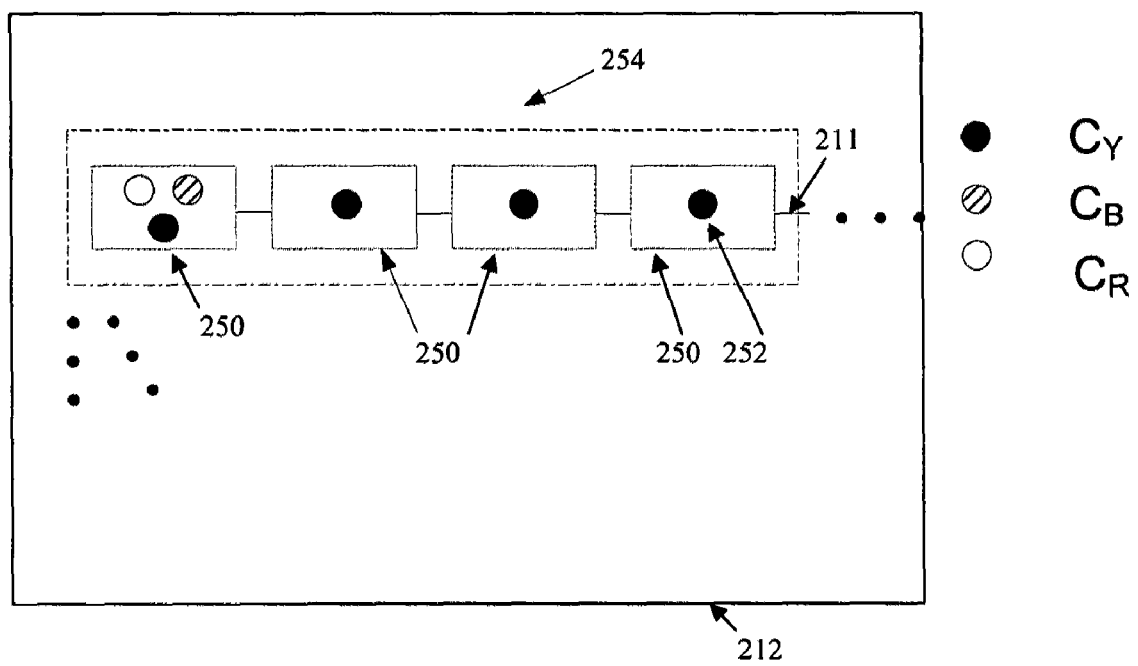
FIG. 6 shows a sub-sampling of the video frame of FIG. 3 at 4:1:1, wherein a macropixel includes six values from four neighboring pixels on one scan line.

Since each pixel component includes either color information (chrominance) or luminance information, and the human eye is more sensitive to luminance, then less chrominance information can be used for display. This is known as sub-sampling. FIG. 3 shows an example of the uncompressed video frame 212 including pixels 250, wherein each pixel 250 includes three components 252 (i.e., $C_Y$, $C_R$, $C_B$) and no sub-sampling is performed. FIG. 4 shows a sub-sampling at 4:2:2, wherein each macropixel 254 includes four samples 252 from two neighboring pixels 250 on one scan line 211. FIG. 5 shows a sub-sampling at 4:2:0, wherein a macropixel 254 includes six samples 252 from four neighboring pixels 250 on two scan lines (211-1, 211-2). FIG. 6 shows a sub-sampling at 4:1:1, wherein a macropixel 254 includes six samples 252 from four neighboring pixels 250 on one scan line 211.

Using sub-sampling at the transmitter, adjacent pixels from a macropixel 254 can be reused at the receiver in place of an erroneous pixel. Since uncompressed video has high spatial correlation, in the event of an erroneous received pixel, the receiver 204 can instead selectively use one of the correctly received and decoded, spatially co-located, macropixels 254. Macropixel size depends on the sub-sampling scheme being used (e.g., FIGS. 3-6). In the absence of a sub-sampling, adjacent pixels 250 can be displayed selectively.

The transmitter spatial grouping function 214 performs spatial grouping of the macropixels into spatial pixel groups. In one implementation, the spatial grouping function 214 uses perceptually important information bits, such as the most significant bits (MSBs), of each pixel component in each macropixel, to determine which adjacent N macropixels have similar values for logical grouping in a spatial pixel group. As a result, all macropixels in a spatial pixel group have the same pair-wise MSBs for luminance and chrominance components (i.e., all $C_Y$ components have the same MSBs, all $C_R$ components have the same MSBs and all $C_B$ components have the same MSBs).

The spatial pixel groups are formed at the transmitter 204 by the spatial grouping function 214 for each uncompressed video frame 212. A new spatial pixel group is started at the beginning of a new video frame. The spatial grouping function 214 delimits each spatial pixel group so that the spatial processing function 220 at the receiver 204 can identify different spatial pixel groups.

Specifically, the spatial grouping function 214 indicates the boundary of each spatial pixel group using a delimiter known to both the transmitter and the receiver. The receiver spatial processing function 220 uses the delimiter to identify each spatial pixel group. The delimiters provide the receiver with information for selectively reusing correctly received pixels in place of erroneous pixels.

When the receiver detects an erroneous pixel, the receiver utilizes the first delimiter before, and the first delimiter after the erroneous pixel, to identify the boundaries of the spatial pixel group to which the erroneous pixel belongs (this applies for all cases except for the very first spatial pixel group, which does not have a delimiter at the beginning). The receiver then selectively uses information from the macropixels in the identified spatial pixel group in place of the erroneous pixel while, e.g., playing back the received video.

Figure 7A:
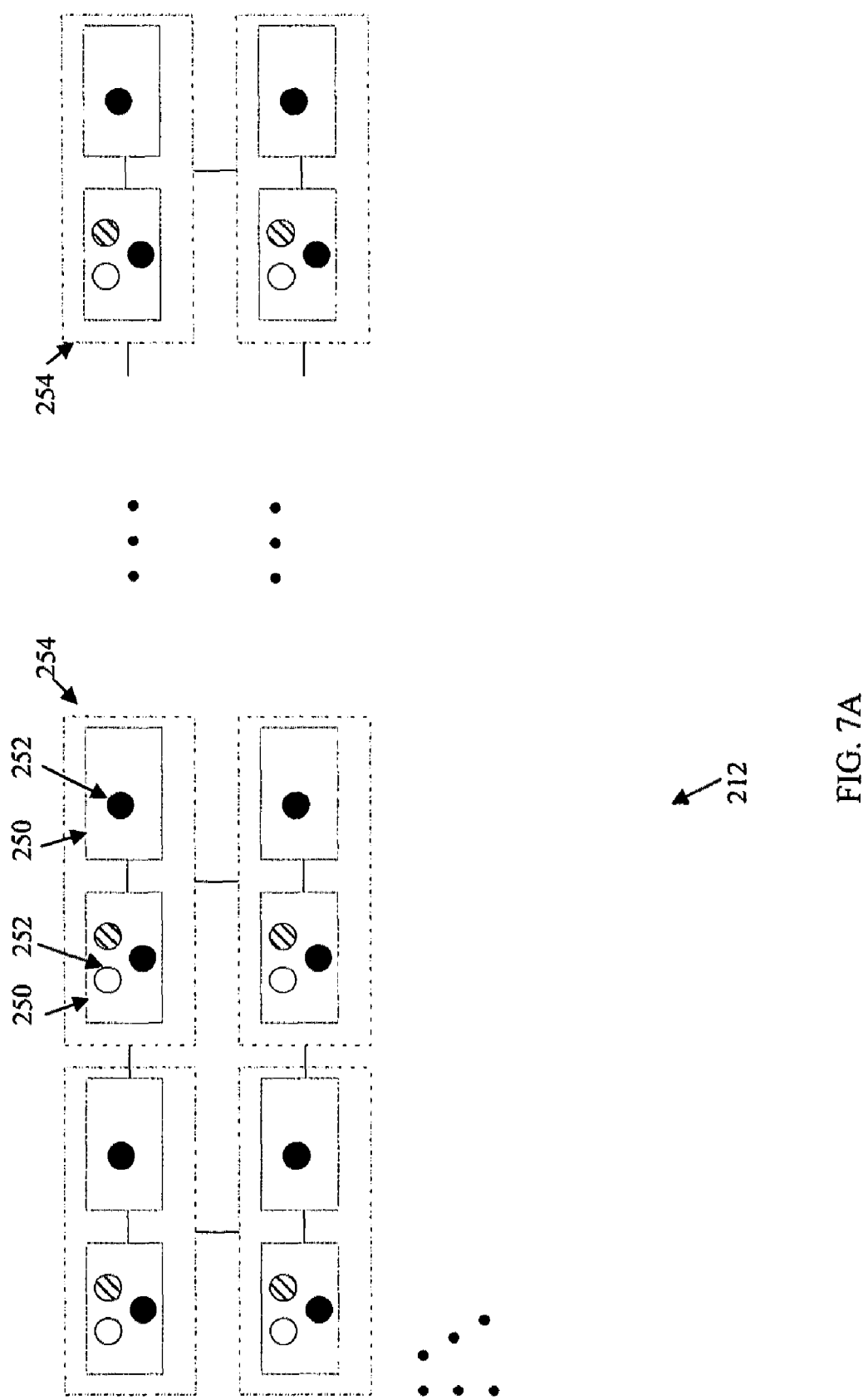
FIG. 7A shows a 4:2:2 sub-sampling in a video frame with macropixels without a spatial pixel group.
Figure 7B:
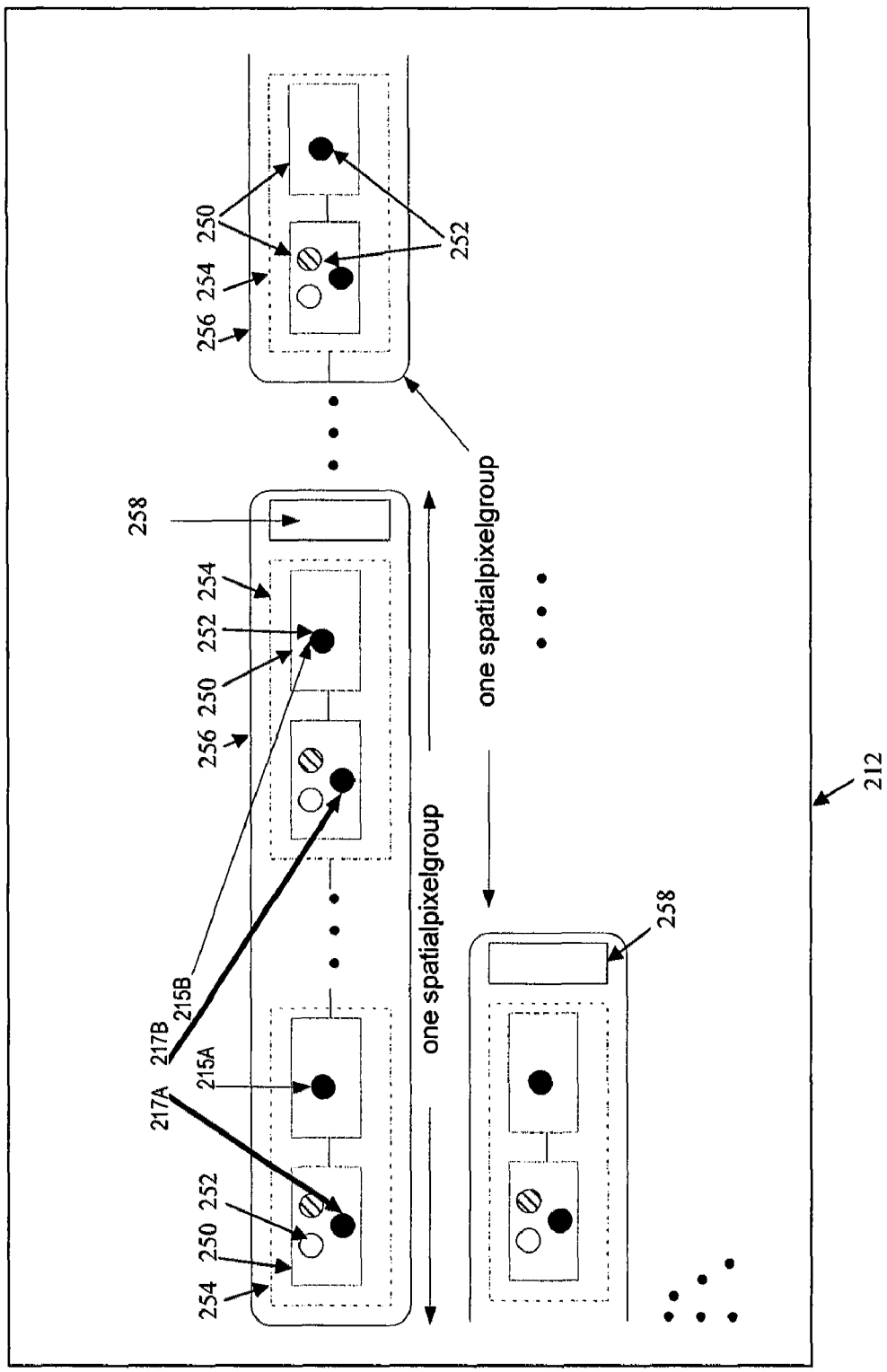
FIG. 7B shows a sub-sampling in a video frame with macropixels, including spatial pixel groups, according to an embodiment of the present invention.

FIG. 7A shows a 4:2:2 sub-sampling in a video frame 212 providing macropixels 254, but without use of spatial pixel groups. FIG. 7B shows the same video frame 212 as in FIG. 7A, but with spatial pixel groups 256 along with delimiters 258. In a spatial pixel group 256 all components 252 (e.g., $C_Y$, $C_B$, or $C_R$) have similar MSBs. MSBs include one or more significant bits (e.g., one MSB bit or a group of MSB bits such as 4 MSB bits).

For example, in FIG. 7B, corresponding components 215A, 215B have similar MSBs, and corresponding components 217A, 217B have similar MSBs. A macropixel with one $C_Y$ component is compared with other macropixels having one $C_Y$ component. Similarly, a macropixel with three $C_Y$ components is compared with other macropixels having three $C_Y$ components.

Figure 8:
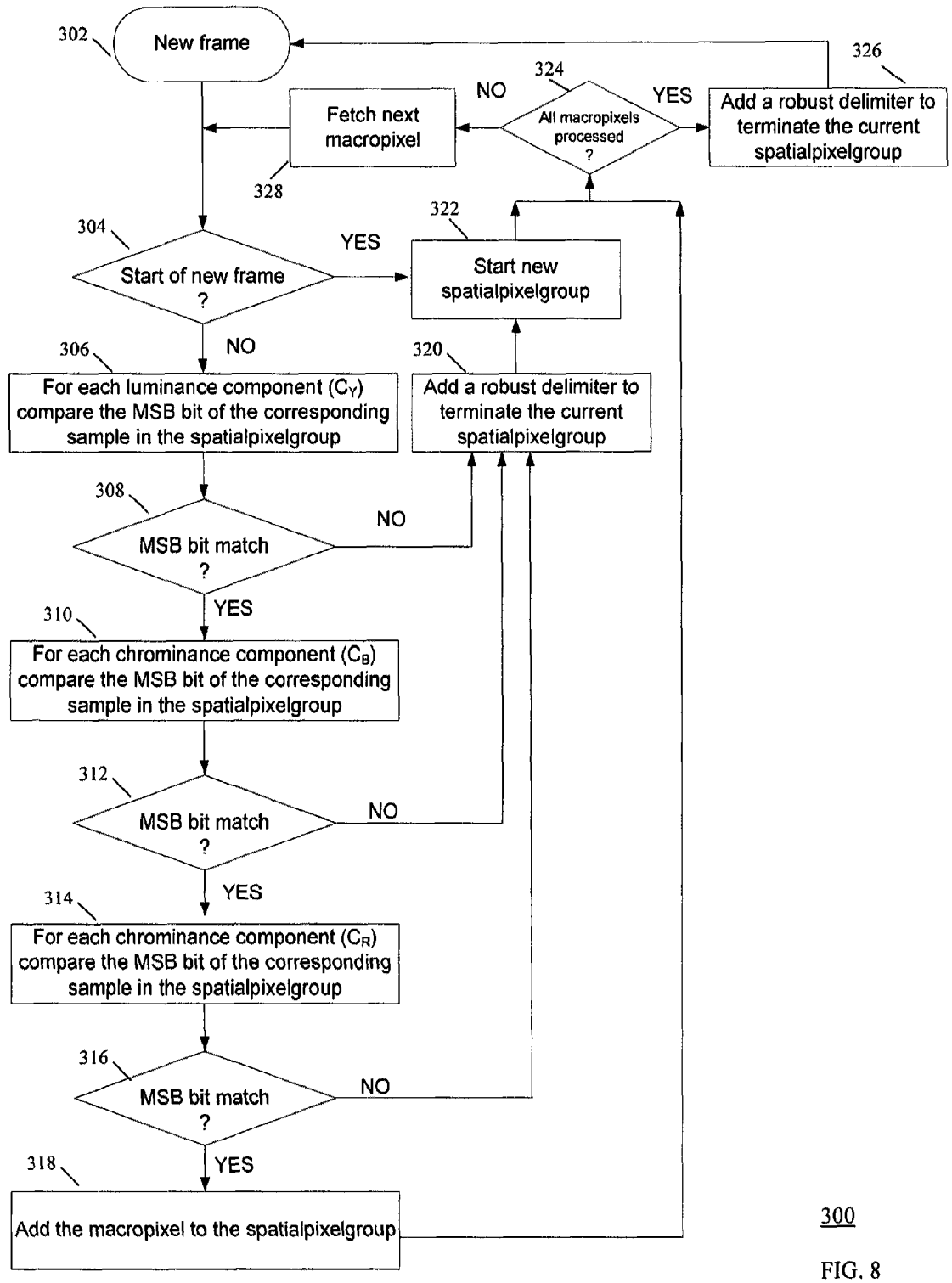
FIG. 8 shows an example flowchart of the steps of forming each spatial pixel group in FIG. 7B using a spatial grouping function, according to an embodiment of the present invention.

FIG. 8 shows an example flowchart of a process 300 for forming each spatial pixel group 256 (FIG. 7B) by the transmitter spatial grouping function 214, including the following steps:

Step 302: Obtain a new frame of sub-sampled video pixels for transmission.

Step 304: Since for each video frame the first spatial pixel group starts from the beginning of the video frame, it is determined if a current macropixel is at the start of the new frame. If yes, go to step 322 to start a new spatial pixel group, otherwise a spatial pixel group is already active (current).

Step 306: For each luminance component ($C_Y$) of the current macropixel, compare the MSB of the component to the MSB of a corresponding component in the spatial pixel group to determine a match.

Step 308: If the MSBs match, then go to step 310, otherwise go to step 320.

Step 310: For each chrominance component ($C_B$) of the current macropixel, compare the MSB of the component to the MSB of a corresponding component in the spatial pixel group.

Step 312: If the MSBs match, then go to step 314, otherwise go to step 320.

Step 314: For each chrominance component ($C_R$) of the current macropixel, compare the MSB of the component to the MSB of a corresponding component in the spatial pixel group, to determine a match Step 316: If the MSBs match, then go to step 318, otherwise go to step 322.

Step 318: Add the macropixel to the spatial pixel group. Go to step 324.

Step 320: Add a robust delimiter to terminate the current spatial pixel group.

Step 322: Start a new spatial pixel group.

Step 324: Determine if all macropixels in the current video frame are processed. If yes, go to step 326, otherwise go to step 328 to process next macropixel in the frame.

Step 326: Add a robust delimiter to terminate the current spatial pixel group. Go to step 302.

Step 328: Obtain the next macropixel in the frame. Go to step 304 to begin processing the macropixel.

Each video frame with the delimited spatial pixel groups is encoded and wirelessly transmitted as packets from the transmitter 202 to the receiver 204. At the receiver 204, the received packets of video data (video transmissions) are decoded, wherein the spatial processing function 220 performs macropixel processing on the information in the decoded packets to identify delimiters for each spatial pixel group in each video frame.

Figure 9:
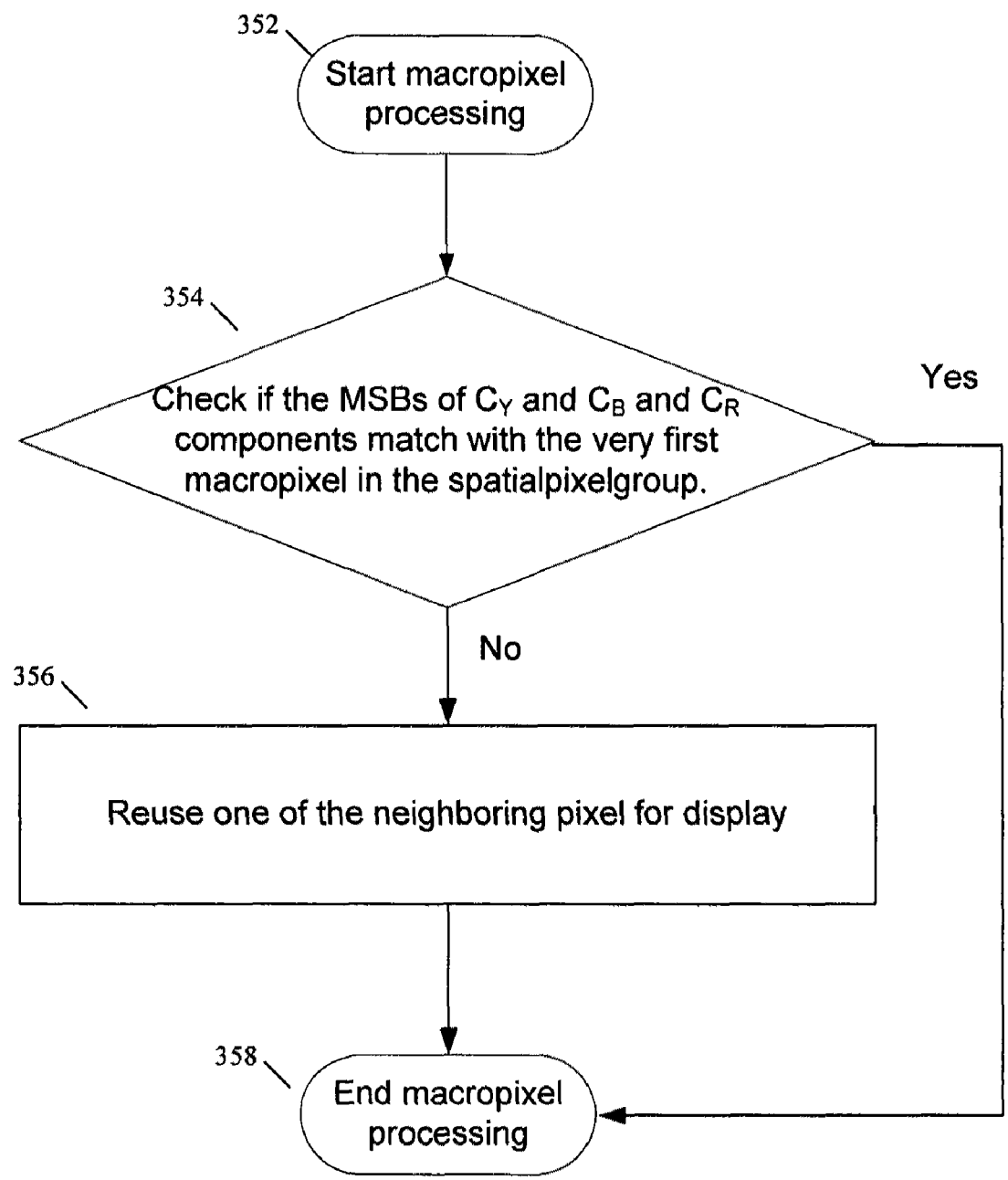
FIG. 9 shows a spatial process in a receiver, according to an embodiment of the present invention.

If the spatial processing function 220 finds that a pixel in a spatial pixel group is erroneous, then one of the correctly received and decoded, spatially co-located, or neighboring macropixels in that spatial pixel group are selectively used in place of the erroneous pixel, to regenerate an uncompressed video frame 224. Such selective reuse of pixels at the receiver reduces the need for retransmission of pixels from the transmitter, while maintaining quality for the received video information. FIG. 9 shows a spatial process 350 implemented by the spatial processing function 220 according to an embodiment of the present invention, including the following steps:

Step 352: Start macropixel processing.

Step 354: In each macropixel, check if the MSBs of $C_Y$ and $C_B$ and $C_R$ components match with the very first macropixel in the spatial pixel group. If yes, go to step 358, otherwise go to step 356.

Step 356: Reuse one of the neighboring pixel for display in place of an erroneous pixel in the spatial pixel group.

Step 358: End macropixel processing.

A packet structure is used for data transmission between wireless stations. A communication module 209 in the transmission station 202 (FIG. 2B) provides a Media Access Control (MAC) layer function and a physical (PHY) layer function, for data aggregation and wireless transmission using one or more antennas. The MAC layer attaches a MAC header MAC Service Data Unit (MSDU), in order to construct a MAC Protocol Data Unit (MPDU). The MAC header includes information such as source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from the wireless station 202 to the wireless station 204, a preamble is attached to the PPDU, wherein the preamble can include channel estimation and synchronization information. Similarly, the receiving station 204 includes a communication module 211 that performs inversely similar functions as the communication module 209 for receiving and processing packets.

Referring back to FIG. 2B, the transmitter FEC encoding function 216 is utilized to combat bit error losses in transmission. The goal of the FEC is to introduce some redundancy so that the receiver can correct a few bits in the event of bit-error loss. The FEC function 216 provides FEC information for the video frames that are transmitted from the transmitter to the receiver, and the reverse FEC function 218 of the receiver utilizes that redundant information for bit-error recovery, to enhance the quality of video transmission.

The FEC function 216 is applied within a spatial pixel group 256 (FIG. 7B) to obtain FEC data or information, wherein spatial properties of the spatial pixel group are utilized to further enhance the quality of uncompressed video. Because all pixel components 252 in a spatial pixel group 256 have similar pair-wise MSBs, the transmitter 202 can save transmission bandwidth by not transmitting all the MSBs, or by replacing some of the MSBs with FEC information to protect the remaining MSBs in the spatial pixel group.

FEC encoding normally requires redundant data, hence, the total data length is increased. In one implementation of the present invention, one or more MSB positions are used to include FEC data. Therefore, FEC is included without increasing the video data packet length. In another example, video data packet length is reduced by withholding certain MSBs from transmission.

Figure 10:
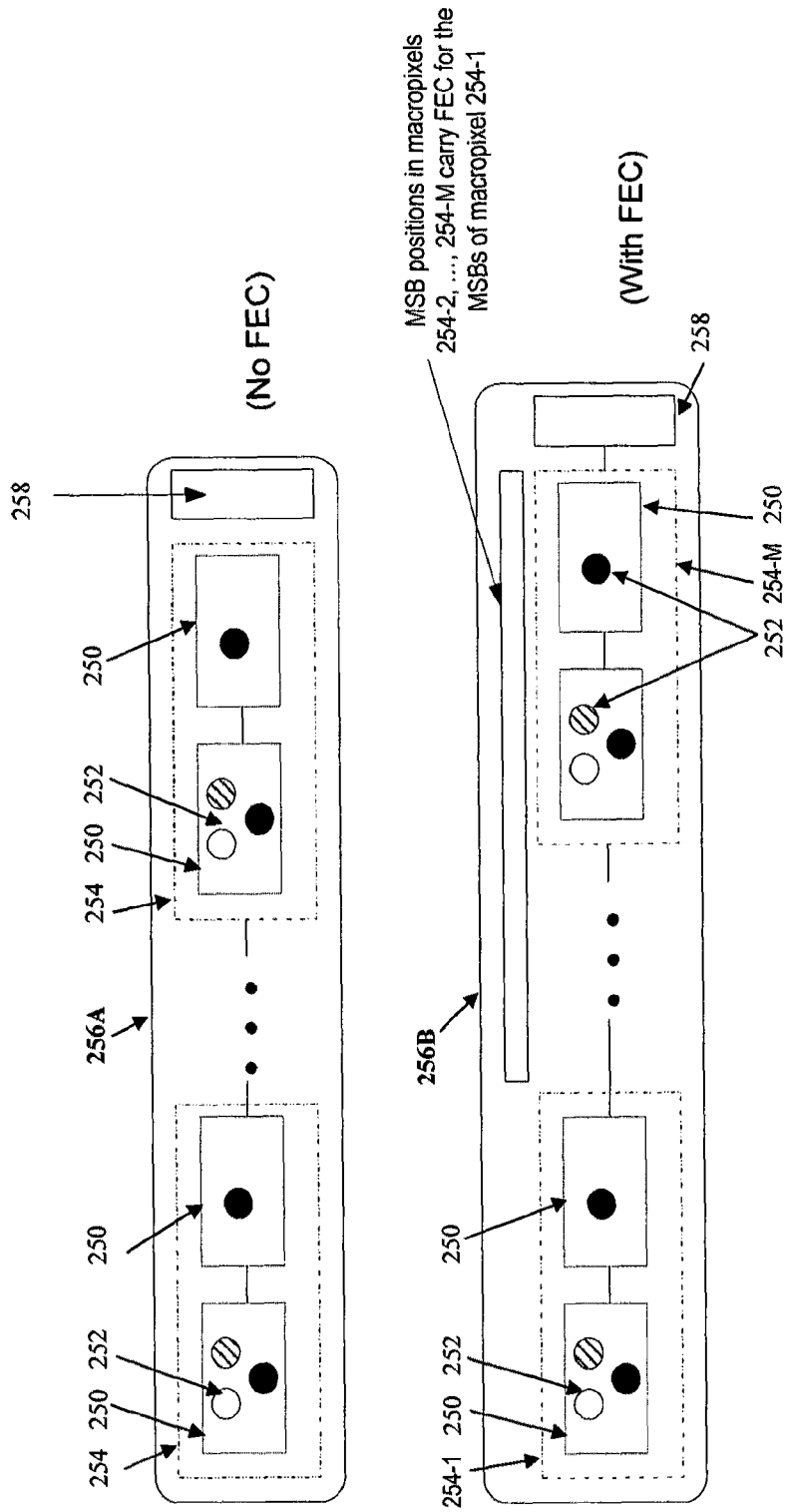
FIG. 10 shows an example forward error correction (FEC) application, according to an embodiment of the present invention.

FIG. 10 shows a spatial pixel group 256A with no FEC, and a spatial pixel group 256B with FEC, according to an embodiment of the present invention. In the spatial pixel group 256B there are M macropixels (254-1, ..., 254-M), wherein the first macropixel 254-1 carries the MSBs of all macropixels 254-1, ..., 254-M of the spatial pixel group 256B (other macropixels 254-2, ..., 254-M need not carry the MSBs).

Then, the MSBs in the first macropixel 254-1 of the spatial pixel group 256B are protected using FEC. This is achieved by: determining FEC data for the MSBs in the first macropixel 254-1 of the spatial pixel group 256B, and using the MSB position of all other macropixels 254-2, ..., 254-M in the spatial pixel group 256B to carry said FEC data for the MSBs in said first macropixel 254-1. As the spatial pixel group 256B has M macropixels 254 (4:2:2 sub-sampling), and each macropixel includes four pixel components, then K*O*4 bits are available (K represents the total number of MSBs in the spatial pixel group 256B and O represents the MSBs in each pixel component) for the FEC over the MSB bits, when all macropixels except the first macropixel do not carry the MSBs.

Figure 11:
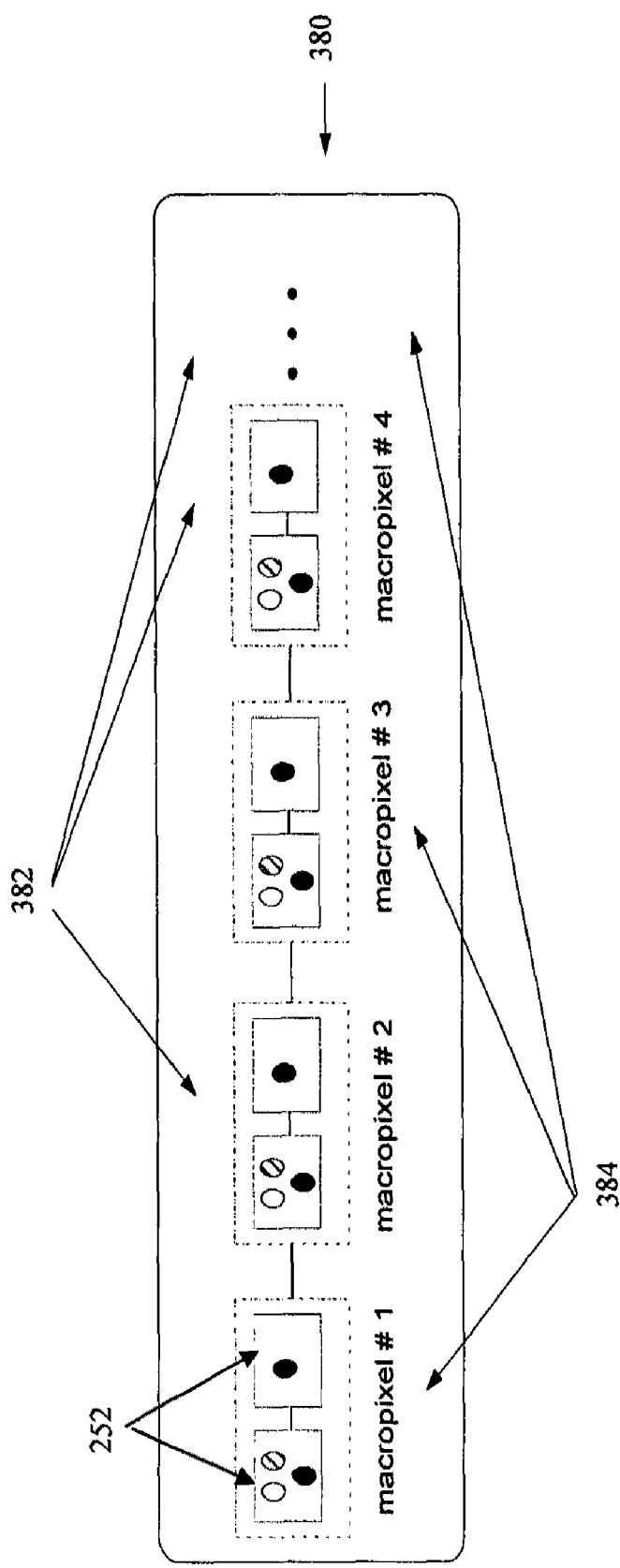
FIG. 11 shows an example spatial grouping of macropixels, according to the present invention.

Referring to FIG. 11, in another example spatial pixel group 380, a fixed number of macropixels among M macropixels do not include MSBs. For example, even macropixels 382 do not include MSBs while odd macropixels 384 do include MSBs. Assuming a 4:2:2 sub-sampling, K/2 bits can be saved for transmission, where K represents the total number of MSBs in the spatial pixel group 382. At the receiver, in case of errors, the MSBs in even numbered macropixels are replaced with the neighboring odd numbered macropixels in the same spatial pixel group. This helps reduce the video transmission application data rate. Therefore, more channel bandwidth is available for retransmissions. Alternatively, a stronger modulation scheme can be used at the PHY layer to protect the data against channel errors.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of wireless communication of video information, comprising the steps of:
grouping pixels in an uncompressed video frame into logical groups of pixels, such that neighboring pixels in each logical group posses high spatial correlation, including the steps of:
grouping sub-samples of components of a set of the neighboring pixels into a macropixel;
logically grouping macropixels with similar component values into a spatial pixel group; and
transmitting each spatial pixel group over a wireless communication medium;
wherein grouping each set of macropixels with similar component values into a corresponding spatial pixel group further includes:
using one or more most significant bits of each component in each macropixel in determining which adjacent N macropixels have similar most significant bits;
logically grouping said N macropixels into a spatial pixel group;
wherein all macropixels in a spatial pixel group have the same pair-wise most significant bits for luminance and chrominance components.

2. The method of claim 1 further including:
receiving the transmitted spatial pixel groups;
for an erroneous pixel in a received spatial pixel group, utilizing component values from one or more selected neighboring pixels in that spatial pixel group, in place of the erroneous pixel.

3. The method of claim 1 further including:
reconstructing a video frame from the received spatial pixel groups, and upon detecting an erroneous pixel in a spatial pixel group, utilizing component values from one or more selected neighboring pixels in that spatial pixel group in place of the erroneous pixel.

4. The method of claim 1 wherein grouping each set of macropixels with similar component values into a corresponding spatial pixel group further includes:
using one or more perceptually important bits of each component in each macropixel in determining which adjacent N macropixels have similar corresponding perceptually important bits; and
logically grouping said N macropixels into a spatial pixel group.

5. The method of claim 1 wherein grouping each set of macropixels with similar component values into a spatial pixel group further includes the step of designating each spatial pixel group with delimiters that indicate the boundaries of each spatial pixel group.

6. The method of claim 2 wherein utilizing component values from one or more selected neighboring pixels in that spatial pixel group in place of an erroneous pixel further includes:
using component values of a correctly received spatially correlated macropixel in the spatial pixel group, in place of the erroneous pixel in that spatial pixel group.

7. The method of claim 6 further including identifying the boundaries of the spatial pixel group based on said delimiters.

8. The method of claim 1 further including:
performing forward error correction (FEC) within each spatial pixel group to obtain FEC data; and
transmitting the FEC data along with the spatial pixel group.

9. The method of claim 8 wherein transmitting the FEC data further includes:
replacing one or more perceptually important bits in a spatial pixel group with FEC data to protect the remaining perceptually important bits in the spatial pixel group.

10. The method of claim 9 wherein transmitting the FEC data further includes:
replacing one or more most significant bits in a spatial pixel group with FEC data to protect the remaining most significant bits in the spatial pixel group.

11. The method of claim 8 wherein transmitting the FEC data for each spatial pixel group further includes:
placing the MSBs of all macropixels in the spatial pixel group into a selected macropixel in the spatial pixel group;
performing FEC for the MSBs in the selected macropixel to obtain FEC data; and
transmitting the FEC data in the spatial pixel group.

12. The method of claim 11 wherein transmitting the FEC data in the spatial pixel group further includes:
using the MSB position of macropixels in the spatial pixel group other than a selected macropixel to store the FEC data for the MSBs in the selected macropixel for transmitting the FEC data in the spatial pixel group.

13. The method of claim 8 further including:
receiving the transmitted spatial pixel groups and the FEC data; and
using the FEC data to recover errors in the received spatial groups.

14. The method of claim 9 further include using one or more perceptually important bit positions to include FEC data, such that FEC data is included in packet transmission while maintaining data packet length.

15. The method of claim 9 further including withholding certain spatially important bits from transmission.

16. The method of claim 1 wherein transmitting each spatial pixel group includes transmitting each spatial pixel group over a 60 GHz frequency band wireless channel.

17. The method of claim 16 wherein the video information comprises uncompressed high-definition video information.

18. A wireless station for communication of video information, comprising:
a spatial grouper configured for grouping pixels in an uncompressed video frame into logical groups of pixels, by:
grouping sub-samples of components of a set of neighboring pixels into a macropixel; and
logically grouping macropixels with similar component values into a spatial pixel group;
a communication module configured for transmitting each spatial pixel group over a wireless communication medium;
wherein grouping each set of macropixels with similar component values into a corresponding spatial pixel group further includes:
using one or more most significant bits of each component in each macropixel in determining which adjacent N macropixels have similar most significant bits;
logically grouping said N macropixels into a spatial pixel group;
wherein all macropixels in a spatial pixel group have the same pair-wise most significant bits for luminance and chrominance components.

19. The wireless station of claim 18 wherein the spatial grouper is further configured for using a perceptually important bit of each component in each macropixel in determining which adjacent N macropixels have similar corresponding perceptually important bits, and logically grouping said N macropixels into a spatial pixel group.

20. The wireless station of claim 18 wherein the spatial grouper is further configured for using one or more most significant bits of each component in each macropixel in determining which adjacent N macropixels have similar most significant bits, and logically grouping said N macropixels into a spatial pixel group.

21. The wireless station of claim 20 wherein all macropixels in a spatial pixel group have the same pair-wise most significant bits for luminance and chrominance components.

22. The wireless station of claim 21 wherein the spatial grouper is further configured for designating each spatial pixel group with delimiters that indicate the boundaries of each spatial pixel group.

23. The wireless station of claim 18 further including an encoder configured for performing forward error correction (FEC) encoding within each spatial pixel group to obtain the FEC data, wherein the communication module is configured for transmitting the FEC data along with the spatial pixel group.

24. The wireless station of claim 23 wherein one or more perceptually important bits in a spatial pixel group with FEC data to protect the remaining perceptually important bits in the spatial pixel group.

25. The wireless station of claim 24 wherein one or more most significant bits in a spatial pixel group are replaced with FEC data to protect the remaining most significant bits in the spatial pixel group.

26. The wireless station of claim 23 wherein the MSBs of all macropixels in a spatial pixel group are placed into a selected macropixel in the spatial pixel group, and forward error correction (FEC) is performed for the MSBs in the selected macropixel to obtain the FEC data, such that the FEC data is transmitted in the spatial pixel group.

27. The wireless station of claim 24 wherein one or more perceptually important bit positions are to include FEC data, such that FEC data is included in packet transmission while maintaining data packet length.

28. The wireless station of claim 24 wherein certain spatially important bits are withheld from transmission.

29. The wireless station of claim 18 wherein the communication module is configured for transmitting each spatial pixel group over a 60 GHz frequency band wireless channel.

30. The wireless station of claim 29 wherein the video information comprises uncompressed high-definition video information.

31. A wireless station for communication of video information, comprising:
a communication module for receiving packets of spatial pixel groups over a wireless communication medium, each spatial group formed by grouping sub-samples of components of a set of neighboring pixels of an uncompressed video frame into a macropixel, and logically grouping macropixels with similar component values into a spatial pixel group;
a spatial processor configured for detecting an erroneous pixel in a received spatial pixel group, and utilizing component values from one or more selected neighboring pixels in that spatial pixel group, in place of the erroneous pixel;
wherein grouping each set of macropixels with similar component values into a corresponding spatial pixel group further includes:
using one or more most significant bits of each component in each macropixel in determining which adjacent N macropixels have similar most significant bits;
logically grouping said N macropixels into a spatial pixel group;
wherein all macropixels in a spatial pixel group have the same pair-wise most significant bits for luminance and chrominance components.

32. The wireless station of claim 31 wherein the spatial processor is further configured for reconstructing a video frame from the received spatial pixel groups, and upon detecting an erroneous pixel in a spatial pixel group, utilizing component values from one or more selected neighboring pixels in that spatial pixel group in place of the erroneous pixel.

33. The wireless station of claim 31 wherein the spatial processor is further configured for using component values of a correctly received spatially correlated macropixel in the spatial pixel group in place of the erroneous pixel in that spatial pixel group.

34. The wireless station of claim 31 wherein the spatial processor is configured for identifying boundaries of the spatial pixel group based on delimiters therein.

35. The wireless station of claim 31 further including:

a decoder configured for performing forward error correction (FEC) decoding on received spatial pixel groups with FEC data;

such that the spatial processor is further configured for using the FEC data to recover errors in the received spatial groups.

36. The wireless station of claim 31 wherein the communication module is configured for receiving each spatial pixel group over a 60 GHz frequency band wireless channel.

37. The wireless station of claim 36 wherein the video information comprises uncompressed high-definition video information.

* * * * *